United States Patent [19]

Alexander

[11] Patent Number: 5,535,543
[45] Date of Patent: Jul. 16, 1996

[54] MEANS AND A METHOD FOR THERMALLY PROTECTING FRUITS AND VEGETABLES WHILE MATURING

[76] Inventor: Tracey S. Alexander, 7470 N. Rosario Cir., Tucson, Ariz. 85704

[21] Appl. No.: 200,672

[22] Filed: Feb. 23, 1994

[51] Int. Cl.⁶ .................................................. A01G 13/00
[52] U.S. Cl. .................................................. 47/26; 383/43
[58] Field of Search .................. 47/26 IF; 229/87.03, 229/928; 383/43

[56] References Cited

U.S. PATENT DOCUMENTS

| | | | |
|---|---|---|---|
| 1,513,866 | 11/1924 | Sheridan | 383/43 |
| 1,994,962 | 3/1935 | Rushfeldt | 47/66 B |
| 2,585,214 | 2/1952 | Belmont | 383/43 |
| 2,600,300 | 6/1952 | Katz | 47/66 B |
| 4,731,042 | 3/1988 | McKay | 383/43 |

FOREIGN PATENT DOCUMENTS

| | | | |
|---|---|---|---|
| 343974 | 10/1904 | France | 47/26 IF |
| 91129 | 1/1982 | Japan | 47/26 IF |
| 3230023 | 9/1988 | Japan | 47/26 IF |
| 3297334 | 12/1991 | Japan | 47/26 IF |
| 617074 | 2/1949 | United Kingdom | 47/26 IF |

*Primary Examiner*—Henry E. Raduazo
*Attorney, Agent, or Firm*—Benman Collins & Sawyer

[57] ABSTRACT

Fruit or vegetables still maturing on a parent plant are protected from damage due to soft freeze by enclosing the fruits or vegetables within a bag made of flexible, thermally insulating, water and air permeable material that remains stable in prolonged sunlight. The bag is globular in shape and has a single elasticized opening. Examples of suitable bag materials include wool, acrylic, modacrylic, polyester, polypropylene, and fiber blends containing these materials. Other suitable materials include jute, flax, and hemp, for use in burlap material.

1 Claim, 2 Drawing Sheets

MEANS AND A METHOD FOR THERMALLY PROTECTING FRUITS AND VEGETABLES WHILE MATURING

BACKGROUND OF THE INVENTION

1. Field of the Invention

The present invention relates to a means and method for protecting maturing fruits and vegetables from low temperature and, more particularly, is concerned with thermally insulating maturing fruits and vegetables during soft freeze utilizing a water and air permeable bag with an elasticized opening.

2. Description of Related Art

Many types of fruits and vegetables cultivated outdoors are susceptible to damage from low surface temperature of the air. For example, freezing temperatures (32° F., 0° C. and below) can destroy maturing citrus fruits such as oranges, lemons, and grapefruits that are not protected.

Two techniques are commonly used to protect susceptible fruits and vegetables from low temperatures. First, large commercial growers may employ auxiliary heating means such as smudge pots to protect their crops. However, the initial capital investment and operating expenses for such systems may prove cost prohibitive to noncommercial growers as well as small commercial growers such as small nurseries. Furthermore, the use of such systems requires growers to be aware of impending low temperatures in order to initiate system operation in anticipation of a drop in temperature. Being on constant alert to the threat of low temperature may prove overly bothersome for many noncommercial growers.

A second technique for protecting susceptible fruits and vegetables from low temperatures involves covering the entire parent plant with a thermally insulating material, such as cardboard, plastic, or wood. While this technique is inexpensive and therefore more accessible to small nurseries and noncommercial growers, it suffers several drawbacks.

One drawback to protecting fruits and vegetables using parent plant coverings is the impracticality of using a cover for a large plant. While growers may cover small- to moderately-sized plants such as tomato plants in anticipation of low temperatures, covering large plants such as tall trees or plants with many branches would likely be impractical and inefficient. Growers without smudge-pot capabilities may therefore be without a means of protecting fruit and vegetables maturing on large plants. A second drawback to parent plant coverings as a technique is the requirement that the grower devote careful attention to weather forecasts. Just as in the case of smudge-pot systems, the grower must be aware of impending low temperatures in order to provide timely protection to susceptible fruits and vegetables. Because such coverings likely inhibit water and light transmission to the parent plant, growers optimally leave the coverings in place only during periods of potentially damaging low temperatures.

In addition to the more common techniques of thermally protecting maturing fruits and vegetables by heating or insulating the entire parent plant, several patents disclose protection systems geared toward individual fruits and vegetables. For example, U.S. Pat. No. 383,327, "Envelope for Protecting Grapes While Maturing", discloses a translucent water-proof envelope that is fastened around grapes using clamps or other suitable fastening devices. The corners of the envelope are turned down to prevent the entrance of foreign materials, and perforations in the bottom and sides of the envelope permit drainage of any water that may enter. While the envelope likely provides effective thermal protection for bunches of grapes, the shape of the envelope is not optimal for protecting spherically-shaped fruits such as oranges and grapefruits. Furthermore, securing the envelope around the grapes requires considerable effort from the grower in the manipulation of fasteners and flaps.

U.S. Pat. No. 3,630,758, "Fruit Harvesting Technique", is directed to a fruit harvesting technique for apples. This method comprises coating the apples in situ on the tree with a cushioning material, preferably a polymer froth foam. The foam is designed to cushion the fruit to prevent damage by physical contact during harvest, handling, and storage, not to thermally insulate the fruit to prevent damage by low temperatures. Furthermore, in the event that this technique could be adapted to thermally insulate fruits and vegetables, noncommercial growers would likely find this technique to be inconvenient. First, the fruit or vegetable would require complete coverage by the foam for effective insulation, making application of the foam tedious and time-consuming. Second, additional applications of the foam may be required, depending on the adherence of the foam to the fruit or vegetable. Third, extensive clean-up efforts may be necessary for the area surrounding the parent plant once the foam has been applied.

U.S. Pat. No. 4,159,596, "Means and a Method for the Self-Pollination of Corn", discloses using a single bag for the self-pollination of corn, such that the upper end of the bag encloses the corn plant tassel and the lower end of the bag encompasses the corn plant shoot. The shape of the bag is elongated and tubular, so that the bag would be an improper shape for containing spherically-shaped fruits such as oranges and grapefruits. Moreover, securing the bag around the corn entails considerable effort by the grower in light of various flaps requiring attention.

U.S. Pat. No. 4,698,226, "Apple Labeling Process", incorporates a single weatherproof bag structure which covers the fruit while still attached to the tree. The surface of the bag does not transmit light, so that the natural color of the apple's skin does not develop until the desired step in the labelling process. The shape of the bag is not globular but oblong with a straight bottom edge, so that the bag does not closely surround the fruit as would be optimal for thermal insulation. The relative difficulty of placing the bag on the fruit cannot be evaluated since the patent did not disclose the type of closure mechanism for the bag.

Thus, a need remains for a means and method of protecting maturing fruit and vegetables from low temperature damage in the following two situations: (1) if auxiliary heating means are unavailable and covering the parent plant proves impractical, and (2) if the grower intends to leave the thermal protection in place for extended periods of time in lieu of anticipating low temperatures. Regarding protecting fruit and vegetables on an individual basis, a need remains for a structure that accommodates a broad range of spherically- and elliptically-shaped fruits and vegetables in a more tailored fit than an envelope or oblong structure. Finally, a need remains for a structure that is easily secured around the individual fruit or vegetable.

DISCLOSURE OF INVENTION

In accordance with the invention, a means and method are provided for protecting fruit and vegetables still maturing on a parent plant from damage due to low temperatures using a single bag to enclose and thermally insulate individual fruits or vegetables.

The means for protecting the maturing fruits and vegetables involves a bag shaped globularly for the purpose of containing such fruits as oranges, grapefruits, and lemons. The bag has a single, elasticized opening that enables a grower to place the bag on the fruit or vegetable by simply slipping the bag over the fruit or vegetable and allowing the elasticized opening to close around the stem of the fruit or vegetable by contraction, obviating the need for fasteners and flaps.

The bag is made of flexible material that provides thermal insulation to the fruit or vegetable while also remaining air and water permeable, making drainage holes unnecessary. Furthermore, the bag is made of material that resists deterioration in sunlight. Examples of materials that meet all of these criteria are wool, acrylic, modacrylic, polyester, polypropylene, as well as blends including these materials. Other examples include jute, flax, and hemp, such as used in burlap material.

The present invention is specifically designed to protect fruits and vegetables in the event of a "soft" or "light" freeze. A "soft freeze" is a condition in which the surface temperature of the air remains below freezing for only a short period of time, perhaps only two days, and in which only tender plants are harmed. On the other hand, a "hard freeze" is one in which all seasonal vegetation is adversely affected. The invention is not designed to protect fruits and vegetables in the event of a hard freeze because of its air and water permeability.

The structure of the present invention affords several advantages over prior practices. First, the invention provides thermal protection for fruits and vegetables of large plants where covering the plant as a whole is impractical and where smudge pot systems are unavailable. Moreover, the bags disclosed in the present invention retain the advantages of plant coverings, namely low cost and reusability.

Second, in regions experiencing occasional soft freeze conditions but no hard freeze conditions, the invention offers a special advantage over cited technology: the grower may enclose fruits and vegetables in the protective bags for extended periods of time, even for months. As a consequence, the grower is relieved of the need to respond quickly to news of threatening low temperatures, which is a particularly attractive feature to growers who are unable to respond quickly for whatever reason, such as travel or illness.

Third, the cited prior patents describe structures that require manipulation of such features as fasteners and flaps to close the structure around the fruit or vegetable. In contrast, the elasticized opening disclosed in the present invention self-closes once the fruit or vegetable is contained in the bag. This feature allows the grower to position the bags more quickly.

Finally, the globular shape of the present invention allows a closer fit than any prior art structure between the bag and spherically- and elliptically-shaped fruits such as oranges, lemons, and grapefruits. The prior art structures disclose pouches, cylinders, tubes and oblong bags or containers. Since a closer fit between the fruit or vegetable translates to more efficient thermal insulation, the globular shape of the present invention affords improved thermal protection.

DESCRIPTION OF THE PREFERRED EMBODIMENTS

The present invention comprises the use of a globular-shaped bag made of a flexible, water and air permeable material to thermally insulate fruits and vegetables maturing on parent plants during periods of soft freeze. The method of protecting fruits or vegetables from soft freeze involves placing a single bag on an individual vegetable or fruit (or bunch of fruits in the case of grapes) in anticipation of soft freeze. To fully realize the advantages of the invention, the preferred embodiment retains the bag in place on the fruit or vegetable until the threat of soft freeze has completely disappeared for the season. Alternatively, the bags may be removed from the fruit or vegetable immediately following individual soft freezes.

Figure 1:
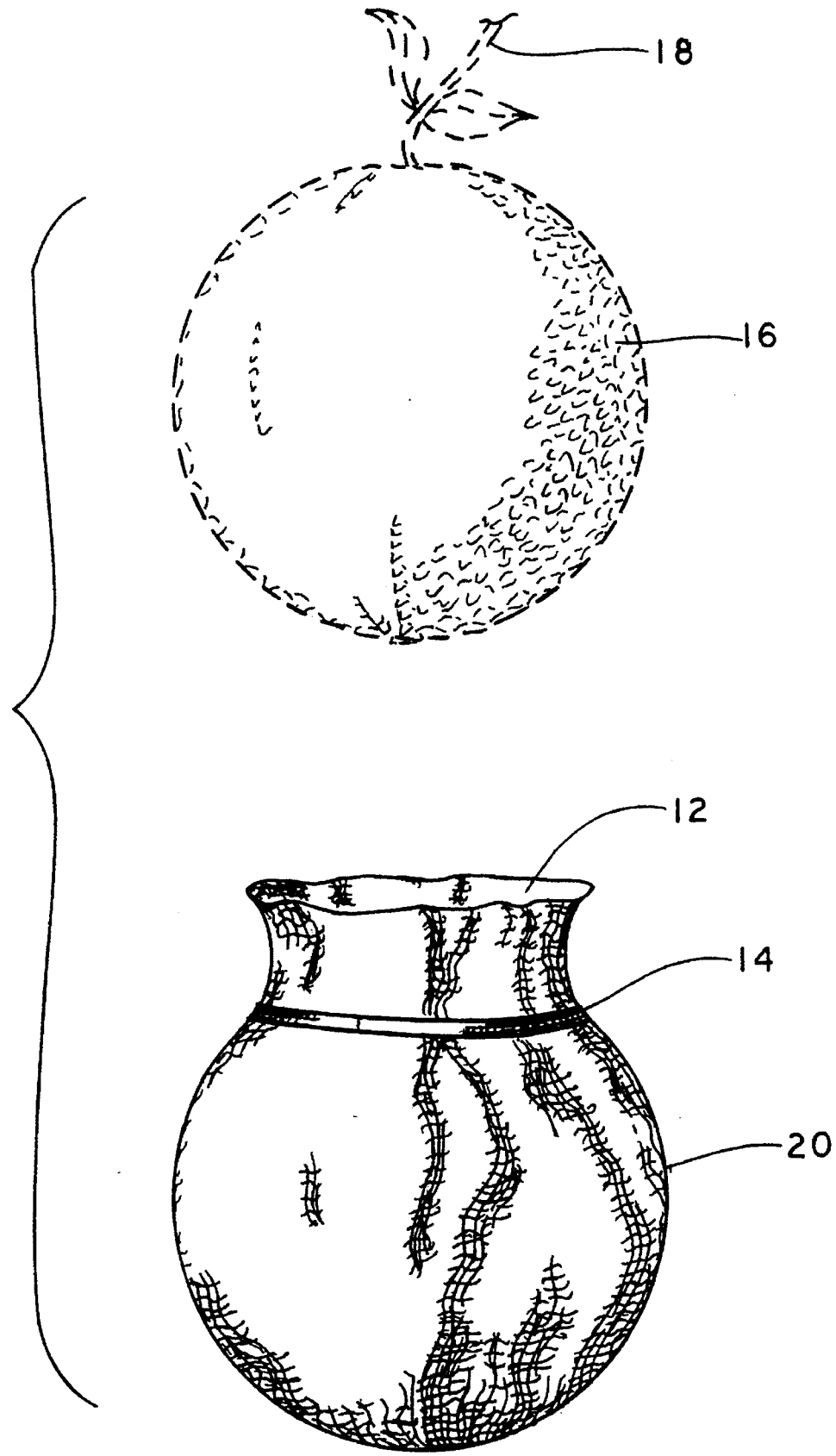
FIG. 1 shows a side elevational view which depicts a bag used with the present invention as its single elasticized opening is expanded to receive an individual maturing fruit.
Figure 2:
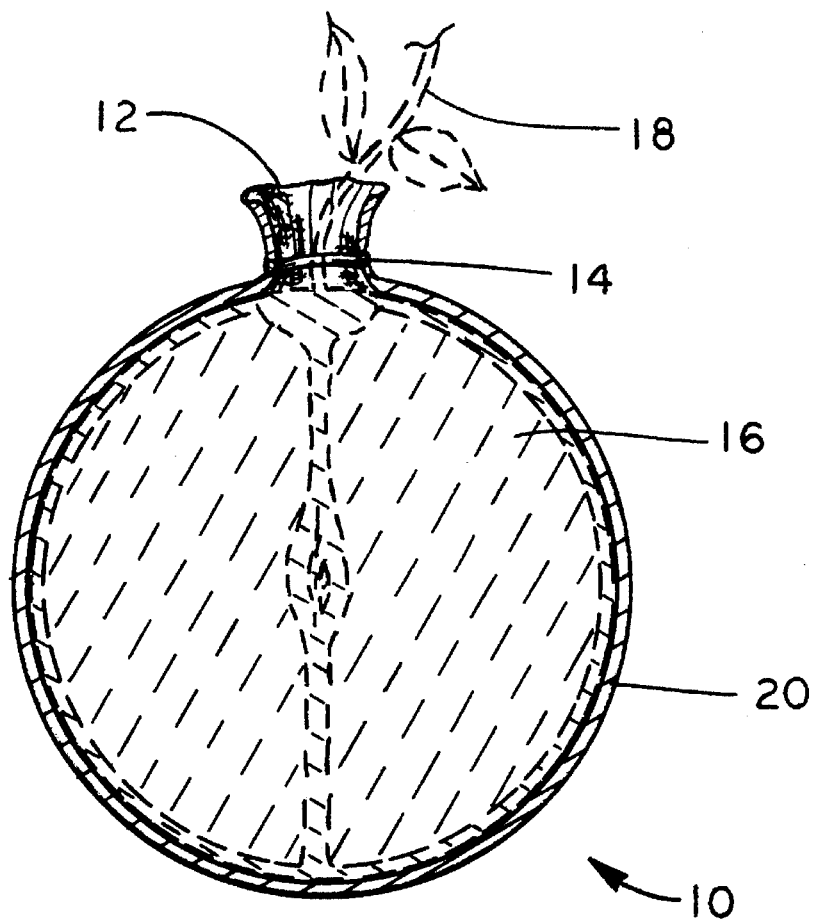
FIG. 2 shows a side elevational view which depicts a maturing fruit enclosed by the bag structure.

Turning now to the Figures, wherein like numerals depict like elements throughout, FIG. 1 shows a single bag 10 embodying the present invention. The bag 10 has a single opening 12 made expandable by a band of elasticized material 14 so that the opening 12 may be enlarged as illustrated in FIG. 1 in order to receive fruit 16 into the body of the bag 10. FIG. 2 shows the fruit 16 enclosed within the body of the bag 10, with opening 12 substantially closed around the stem 18 of a fruit 16 by the contraction of the band of elasticized material 14 to its unstressed shape.

In the preferred embodiment of the structure 10 shown in FIGS. 1 and 2, the material forming the bag is thermally insulating, flexible, and is resistant to deterioration from exposure to prolonged sunlight so that the bag retains its reusable quality. Furthermore, the material is air and water permeable, allowing drainage of water that may seep into the bag. The use of wool to form the body of the structure is preferred, but other common materials meeting these qualifications include such man-made fibers as acrylic, modacrylic, polyester, polypropylene as well as fiber blends containing these materials. Other examples include jute, flax, and hemp, such as used in burlap material.

Figure 3:
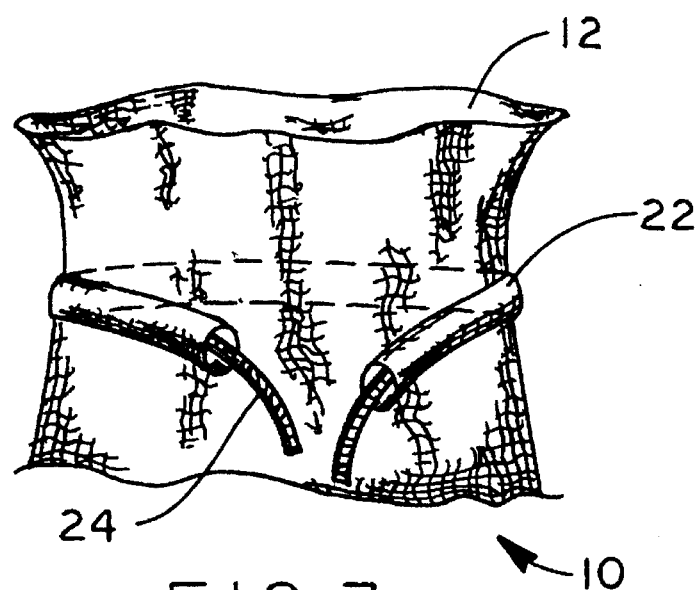
FIG. 3 shows an enlarged side elevational view of the elasticized opening shown in FIGS. 1 and 2 as it is constructed using a casing and an elastic band.

Also, as seen in the structure 10 in FIGS. 1 and 2, the single opening of the bag is elasticized. One method of elasticizing the opening 12 is illustrated in FIG. 3. Referring to FIG. 3, a strip of material is stitched to the bag forming a casing or "tunnel" 22 to enclose an elastic band 24 of a desired width, approximately 0.50 inches in the preferred embodiment. The casing 22 may be applied to the outside of the bag or the inside of the bag, as in the preferred embodiment. The length of the elastic band 24 governs the size of the opening 12, so that the elastic band is cut to a length that will enable the bag to substantially close around the stem 18 of a fruit or vegetable. The elastic band is threaded through the casing and its ends are stitched together. The casing is then stitched closed so that the elastic band is completely enclosed within the casing. In another embodiment, the opening is elasticized after the manner of a gym sock, for example, without using a casing structure.

The shape of the body of the structure 10 in FIGS. 1 and 2 is globular to allow a more tailored fit than prior art structures between the bag and certain fruits and vegetables, so that the bag provides more effective thermal insulation.

The shape of the bag is particularly well-suited for citrus fruits such as oranges tangelos, grapefruits, and lemons, all of which are susceptible to damage from a soft freeze. FIGS. 1 and 2 utilize an orange 16 for illustration. Other spherically and elliptically-shaped fruits or vegetables such as tomatoes, peaches, pears, and plums also benefit from the shape of the inventive structure. However, the globular shape of the bag renders the bag versatile; its protective qualities are not limited to substantially round fruit or vegetables. Furthermore, the size of bag may be varied to accommodate any fruit or vegetable.

Thus, there has been disclosed a means and method for thermally protecting fruits and vegetables still maturing from soft freeze. It will be readily apparent to those of ordinary skill in this art that various changes and modifications of an obvious nature may be made, and all such changes and modifications are considered to fall within the scope of the invention, as defined by the appended claims.

What is claimed is:

1. A protector for protecting fruit and vegetables still attached to parent plants from soft freeze, comprising:

(a) a bag substantially globular in shape so that said bag may enclose fruit or vegetable;

(b) said bag having a single elasticized opening capable of being expanded to receive said fruit or vegetable into said bag and capable of contracting to substantially close said opening, thereby enclosing said bag around said fruit or vegetable; and (c) said bag composed of a flexible, thermally insulating, water and air permeable material stable in sunlight, said material comprising wool.

* * * * *